US011257498B2

(12) United States Patent
Gruenstein et al.

(10) Patent No.: US 11,257,498 B2
(45) Date of Patent: *Feb. 22, 2022

(54) RECORDED MEDIA HOTWORD TRIGGER SUPPRESSION

(71) Applicant: Google LLC, Mountain View, CA (US)

(72) Inventors: Alexander H. Gruenstein, Mountain View, CA (US); Johan Schalkwyk, Scarsdale, NY (US); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,109

(22) Filed: Nov. 20, 2020

(65) Prior Publication Data
US 2021/0074292 A1     Mar. 11, 2021

Related U.S. Application Data

(63) Continuation of application No. 15/799,501, filed on Oct. 31, 2017, now Pat. No. 10,867,600.
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/08* (2013.01); *G10L 15/30* (2013.01);
(Continued)

(58) Field of Classification Search
CPC .... G10L 15/22; G10L 2015/088; G06F 3/167
See application file for complete search history.

(56) References Cited

U.S. PATENT DOCUMENTS 4,363,102 A   12/1982   Holmgren et al.
5,659,665 A    8/1997   Whelpley, Jr.
(Continued)

FOREIGN PATENT DOCUMENTS

JP   S59180599 A   10/1984
JP   H1152976 A    2/1999
(Continued)

OTHER PUBLICATIONS

'www.dailymail.co.uk' [online] "Not so Smart Now! Watch as Google's Home AI speaker answers back to the firm's own TV ads" Nov. 4, 2016, [Retrieved on Nov. 26, 2019], Retrieved from Internet: URL<https://www.dailymail.co.uk/sciencetech/article-3906652/Not-smart-Watch-Google- <http://www.dailymail.co.uk/sciencetech/article-3906652/Not-smart-Watch-Google-> s-Home-AI-speaker-answers-firm-s-TV-ads.html> 5 pages.
(Continued)

*Primary Examiner* — Bryan S Blankenagel
(74) *Attorney, Agent, or Firm* — Honigman LLP; Brett A. Krueger; Grant Griffith

(57) ABSTRACT

Methods, systems, and apparatus, including computer programs encoded on a computer storage medium, for hotword trigger suppression are disclosed. In one aspect, a method includes the actions of receiving, by a microphone of a computing device, audio corresponding to playback of an item of media content, the audio including an utterance of a predefined hotword that is associated with performing an operation on the computing device. The actions further include processing the audio. The actions further include in response to processing the audio, suppressing performance of the operation on the computing device.

20 Claims, 4 Drawing Sheets

Related U.S. Application Data

(60) Provisional application No. 62/497,044, filed on Nov. 7, 2016.

(51) Int. Cl.
   *G10L 15/08* (2006.01)
   *G10L 15/30* (2013.01)
   *G10L 25/51* (2013.01)
   *G10L 17/00* (2013.01)

(52) U.S. Cl.
   CPC .............. *G10L 25/51* (2013.01); *G10L 17/00* (2013.01); *G10L 2015/088* (2013.01); *G10L 2015/223* (2013.01)

(56) References Cited

U.S. PATENT DOCUMENTS

| | | |
|---|---|---|
| 5,897,616 A | 4/1999 | Kanevsky et al. |
| 5,983,186 A | 11/1999 | Miyazawa et al. |
| 6,141,644 A | 10/2000 | Kuhn et al. |
| 6,567,775 B1 | 5/2003 | Maali et al. |
| 6,671,672 B1 | 12/2003 | Heck |
| 6,744,860 B1 | 6/2004 | Schrage |
| 6,826,159 B1 | 11/2004 | Shaffer et al. |
| 6,931,375 B1 | 8/2005 | Bossemeyer, Jr. et al. |
| 6,973,426 B1 | 12/2005 | Schier et al. |
| 7,016,833 B2 | 3/2006 | Gable et al. |
| 7,222,072 B2 | 5/2007 | Chang |
| 7,571,014 B1 | 8/2009 | Lambourne et al. |
| 7,720,012 B1 | 5/2010 | Borah et al. |
| 7,904,297 B2 | 3/2011 | Mirkovic et al. |
| 8,099,288 B2 | 1/2012 | Zhang et al. |
| 8,194,624 B2 | 6/2012 | Park et al. |
| 8,200,488 B2 | 6/2012 | Kemp et al. |
| 8,209,174 B2 | 6/2012 | Al-Telmissani |
| 8,214,447 B2 | 7/2012 | Deslippe et al. |
| 8,340,975 B1 | 12/2012 | Rosenberger |
| 8,588,949 B2 | 11/2013 | Lamboume et al. |
| 8,670,985 B2 | 3/2014 | Lindahl et al. |
| 8,700,392 B1 | 4/2014 | Hart et al. |
| 8,713,119 B2 | 4/2014 | Lindahl |
| 8,717,949 B2 | 5/2014 | Crinon et al. |
| 8,719,009 B2 | 5/2014 | Baldwin et al. |
| 8,719,018 B2 | 5/2014 | Dinerstein |
| 8,768,687 B1 | 7/2014 | Quasthoff et al. |
| 8,775,191 B1 | 7/2014 | Sharifi et al. |
| 8,805,890 B2 | 8/2014 | Zhang et al. |
| 8,838,457 B2 | 9/2014 | Cerra et al. |
| 8,938,394 B1 | 1/2015 | Faaborg et al. |
| 8,996,372 B1 | 3/2015 | Secker-Walker et al. |
| 9,142,218 B2 | 9/2015 | Schroeter |
| 9,548,053 B1 | 1/2017 | Basye et al. |
| 9,691,378 B1 * | 6/2017 | Meyers .................. G10L 15/20 |
| 9,728,188 B1 * | 8/2017 | Rosen ..................... G10L 25/51 |
| 9,786,294 B1 | 10/2017 | Bezos et al. |
| 10,026,399 B2 | 7/2018 | Gopalan et al. |
| 10,074,364 B1 * | 9/2018 | Wightman ............. G10L 17/04 |
| 10,079,015 B1 | 9/2018 | Lockhart et al. |
| 10,453,460 B1 | 10/2019 | Wightman et al. |
| 2002/0049596 A1 | 4/2002 | Burchard et al. |
| 2002/0072905 A1 | 6/2002 | White et al. |
| 2002/0123890 A1 | 9/2002 | Kopp et al. |
| 2002/0193991 A1 | 12/2002 | Bennett et al. |
| 2003/0200090 A1 | 10/2003 | Kawazoe |
| 2003/0220797 A1 | 11/2003 | Ito |
| 2003/0231746 A1 | 12/2003 | Hunter et al. |
| 2004/0101112 A1 | 5/2004 | Kuo |
| 2005/0165607 A1 | 7/2005 | Di Fabbrizio et al. |
| 2006/0074656 A1 | 4/2006 | Mathias et al. |
| 2006/0085188 A1 | 4/2006 | Goodwin et al. |
| 2006/0184370 A1 | 8/2006 | Kwak et al. |
| 2007/0100620 A1 | 5/2007 | Tavares |
| 2007/0198262 A1 | 8/2007 | Mindlin et al. |
| 2008/0085686 A1 | 4/2008 | Kalik |
| 2008/0252595 A1 | 10/2008 | Boillot |
| 2009/0258333 A1 | 10/2009 | Yu |
| 2009/0292541 A1 | 11/2009 | Daya et al. |
| 2010/0070276 A1 | 3/2010 | Wasserblat et al. |
| 2010/0110834 A1 | 5/2010 | Kim et al. |
| 2011/0026722 A1 | 2/2011 | Jing et al. |
| 2011/0054892 A1 | 3/2011 | Jung et al. |
| 2011/0060587 A1 | 3/2011 | Phillips et al. |
| 2011/0066429 A1 | 3/2011 | Shperling et al. |
| 2011/0184730 A1 | 7/2011 | LeBeau et al. |
| 2011/0304648 A1 | 12/2011 | Kim et al. |
| 2012/0084087 A1 | 4/2012 | Yang et al. |
| 2012/0136923 A1 | 5/2012 | Grube |
| 2012/0232896 A1 | 9/2012 | Taleb et al. |
| 2012/0265528 A1 | 10/2012 | Gruber et al. |
| 2013/0060571 A1 | 3/2013 | Soemo et al. |
| 2013/0124207 A1 | 5/2013 | Sarin et al. |
| 2013/0132086 A1 | 5/2013 | Xu et al. |
| 2013/0183944 A1 | 7/2013 | Mozer et al. |
| 2013/0289996 A1 | 10/2013 | Fry |
| 2013/0325479 A1 | 12/2013 | Krueger et al. |
| 2014/0006825 A1 | 1/2014 | Shenhav |
| 2014/0012573 A1 | 1/2014 | Hung et al. |
| 2014/0012578 A1 | 1/2014 | Morioka |
| 2014/0088961 A1 | 3/2014 | Woodward et al. |
| 2014/0163978 A1 | 6/2014 | Basye et al. |
| 2014/0222430 A1 | 8/2014 | Rao |
| 2014/0249817 A1 | 9/2014 | Hart et al. |
| 2014/0257821 A1 | 9/2014 | Adams et al. |
| 2014/0274211 A1 | 9/2014 | Sejnoha et al. |
| 2014/0278383 A1 | 9/2014 | Fan |
| 2014/0278435 A1 | 9/2014 | Ganong, III et al. |
| 2015/0081295 A1 | 3/2015 | Yun et al. |
| 2015/0154953 A1 | 6/2015 | Bapat et al. |
| 2015/0228274 A1 | 8/2015 | Leppanen et al. |
| 2015/0245154 A1 | 8/2015 | Dadu et al. |
| 2015/0262577 A1 | 9/2015 | Nomura |
| 2015/0379989 A1 | 12/2015 | Balasubramanian et al. |
| 2016/0104483 A1 | 4/2016 | Foerster et al. |
| 2016/0155443 A1 | 6/2016 | Khan et al. |
| 2016/0189715 A1 | 6/2016 | Nishikawa |
| 2016/0260431 A1 | 9/2016 | Newendorp et al. |
| 2016/0275070 A1 | 9/2016 | Corston et al. |
| 2017/0019580 A1 | 1/2017 | Boghosian et al. |
| 2017/0048580 A1 | 2/2017 | Wickramasuriya et al. |
| 2018/0199123 A1 | 7/2018 | Rao et al. |

FOREIGN PATENT DOCUMENTS

| | | |
|---|---|---|
| JP | H11231896 A | 8/1999 |
| JP | 2000310999 A | 11/2000 |
| JP | 2005055667 A | 3/2005 |
| JP | 2006227634 A | 8/2006 |
| JP | 2011227237 A | 11/2011 |
| JP | 2014092777 A | 5/2014 |
| KR | 20140031391 A | 3/2014 |
| WO | 1998040875 A1 | 9/1998 |
| WO | 2014008194 A1 | 1/2014 |
| WO | 2014107413 A1 | 7/2014 |
| WO | 2014124332 A2 | 8/2014 |
| WO | 2015025330 A1 | 2/2015 |
| WO | 2016057268 A1 | 4/2016 |

OTHER PUBLICATIONS

International Preliminary Report on Patentability issued in International Application No. PCT/US2017/058981, dated Sep. 25, 2018, 16 pages.

International Search Report and Written Opinion in International Application No. PCT/US2017/058981, dated Feb. 23, 2018, 15 pages.

Prigg, "Not so smart now! Watch as Google's Home AI speaker answers back to the firm's own TV ads," Daily Mail, dated Nov. 4, 2016, 24 pages.

Auckenthaler et al. "Score Normalization for Text-independent Speaker Verification System," Digital Signal Processing, vol. 10, 2000, 13 pages.

(56) References Cited

OTHER PUBLICATIONS

Extended European Search Report in European Application No. 16207288.8-1914, dated Apr. 4, 2017, 8 pages.
Extended European Search Report issued in Application No. 16195834.3-1910, dated Nov. 23, 2016, 9 pages.
Extended European Search Report issued in European Application No. 16193577.0, dated Nov. 23, 2016, 8 pages.
International Preliminary Report on Patentability in International Application No. PCT/US2015/052860, dated Apr. 11, 2017, 9 pages.
International Preliminary Report on Patentability in International Application No. PCT/US2015/052870, dated Apr. 11, 2017, 8 pages.
International Search Report and Written Opinion in International Application No. PCT/US2015/052860, dated Dec. 8, 2015, 12 pages.
International Search Report and Written Opinion in International Application No. PCT/US2015/052870, dated Dec. 4, 2015, 11 pages.
Jae-Seung, Choi, "Text-dependent Speaker Recognition using Characteristic Vectors in Speech Signal and Normalized Recognition Method," Journal of Korean Institute of Information Technology, 10(5), May 2012, 7 pages (English Abstract).

\* cited by examiner

RECORDED MEDIA HOTWORD TRIGGER SUPPRESSION

CROSS-REFERENCE TO RELATED APPLICATIONS

This application is a continuation of, and claims priority under 35 U.S.C. § 120 from, U.S. patent application Ser. No. 15/799,501, filed on Oct. 31, 2017, which claims priority under 35 U.S.C. § 119(e) to U.S. Provisional Application No. 62/497,044, filed on Nov. 7, 2016. The disclosures of these prior applications are considered part of the disclosure of this application and are hereby incorporated by reference in their entireties.

TECHNICAL FIELD

This specification generally relates to systems and techniques for recognizing the words that a person is speaking, otherwise referred to as speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. In order to avoid picking up utterances made in the surrounding environment that are not directed to the system, hotwords are used. A hotword (also referred to as an "attention word" or "voice action initiation command") is a predetermined word or term that is spoken to invoke the attention of the system. When the system detects that the user has spoken a hotword, the system enters a ready state for receiving further user commands.

SUMMARY

In a speech-enabled system, the users' manner of interacting with the system is designed to be primarily, if not exclusively, by means of voice input. The system, which is potentially activated when it picks up a hotword included in received audio, must have some way of discerning when the hotword is not directed by a user towards the system. For example, a commercial being broadcast on a television might contain the hotword and might subsequently trigger devices in the vicinity that are running hotword detection. The devices might then be activated and await an ensuing command or query to respond to, and/or perform an operation on the device based on the command or query following the hotword. One way to prevent this from happening is to use audio fingerprinting technology to recognize that the audio including the hotword is a part of recorded media, and to suppress the performance of the operation on the computing device.

According to one innovative aspect of the subject matter described in this specification, a computing device receives audio that includes an utterance of a predefined hotword that is associated with performing an operation on the computing device. The computing device determines whether the audio corresponds to the playback of an item of media content. The computing device then suppresses the performance of the operation on the computing device.

In general, another innovative aspect of the subject matter described in this specification may be embodied in methods that include the actions of receiving audio corresponding to playback of an item of media content, the audio including an utterance of a predefined hotword that is associated with performing an operation on the computing device; processing the audio; in response to processing the audio, suppressing performance of the operation on the computing device.

In another aspect of the subject matter described in this specification may be embodied in methods that include the actions of receiving audio corresponding to playback of an item of media content, the audio including an utterance of a predefined hotword that is associated with performing an operation on the computing device, providing audio data corresponding to the audio; receiving instructions to suppress performance of the operation on the computing device; and in response to receiving the instructions to suppress performance of the operations on the computing device, suppressing performance of the operation on the computing device.

These and other embodiments can each optionally include one or more of the following features. In certain aspects, the action of processing the audio comprises processing the audio without performing speech recognition on the audio. The actions further include providing, to one or more computing devices, an indication that performance of the operation on the computing device has been suppressed. The actions further include generating an audio fingerprint of a portion of the audio; comparing the audio fingerprint to one or more audio fingerprints; and based on comparing the audio fingerprint to the one or more audio fingerprints, determining that the audio fingerprint corresponds to at least one of the one or more audio fingerprints. The action of comparing the audio fingerprint to one or more audio fingerprints comprises providing the audio fingerprint to a computing device that stores the one or more audio fingerprints; providing, to the computing device that stores the one or more audio fingerprints, a request to compare the audio fingerprint to the one or more audio fingerprints; and receiving, from the computing device that stores the one or more audio fingerprints, comparison data based on comparing the audio fingerprint to the one or more audio fingerprints.

In some implementations, the computing device remains in a low power/sleep/inactive state while receiving the audio, processing the audio, and suppressing performance of the operation. In some implementations, while receiving the audio, providing, to a display of the computing device, data indicating that the computing device is receiving the audio. In some implementations, while receiving the audio, providing, to a display of the computing device, data indicating that the computing device is processing the audio.

In some implementations, in response to processing the audio, deactivating a display of the computing device. In other implementations, in response to processing the audio, returning the computing device to a low power/sleep/inactive state. In some implementations, in response to processing the audio, providing, to a display of the computing device, data indicating that the computing device suppressed performance of the operation on the computing device.

In certain aspects, the method includes providing, for output, a selectable option that, upon selection by a user, provides an instruction to the computing device to perform the operation on the computing device. In some implementations, the actions further include detecting a selection of the selectable option; and adjusting a process for processing subsequently received audio that includes an utterance of the predefined hotword.

In some implementations, processing the audio comprises processing a portion of the audio before the predefined hotword. In some implementations, processing the audio comprises processing a portion of the audio following the predefined hotword. In certain aspects, further actions include determining that the audio includes an utterance of the predefined hotword, wherein the audio is processed based on determining that the audio includes an utterance of the predefined hotword. The action of determining that the audio includes an utterance of the predefined hotword comprises determining that the audio includes an utterance of the predefined hotword comprises without performing speech recognition on the audio.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. Devices can ignore commands not directed by users at the system by detecting hotwords included in pre-recorded audio and suppressing corresponding operations on the device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In speech-enabled environments, devices are continuously listening for hotwords. Each time the words "OK computer" are spoken, it is picked up by a microphone, conveyed to the system, which performs speech processing operations to determine whether the hotword was spoken and, if so, awaits an ensuing command or query. It may be desirable to suppress the response to hotwords from sources that are not likely to be the ones intended to address the device. For example, when a commercial containing the words "OK computer" is played back on a television in the vicinity of the device, it is likely that it will trigger the device to enter a ready state for receiving further commands. If a query or command follows the hotword, the device might perform an operation based on the query, even though the query is not actually addressed to the device. This is an unintended and disruptive problem. The present specification addresses the problem of hotwords within recorded media, and suppressing reaction to the hotword within such recorded media on devices in the vicinity.

Figure 1:
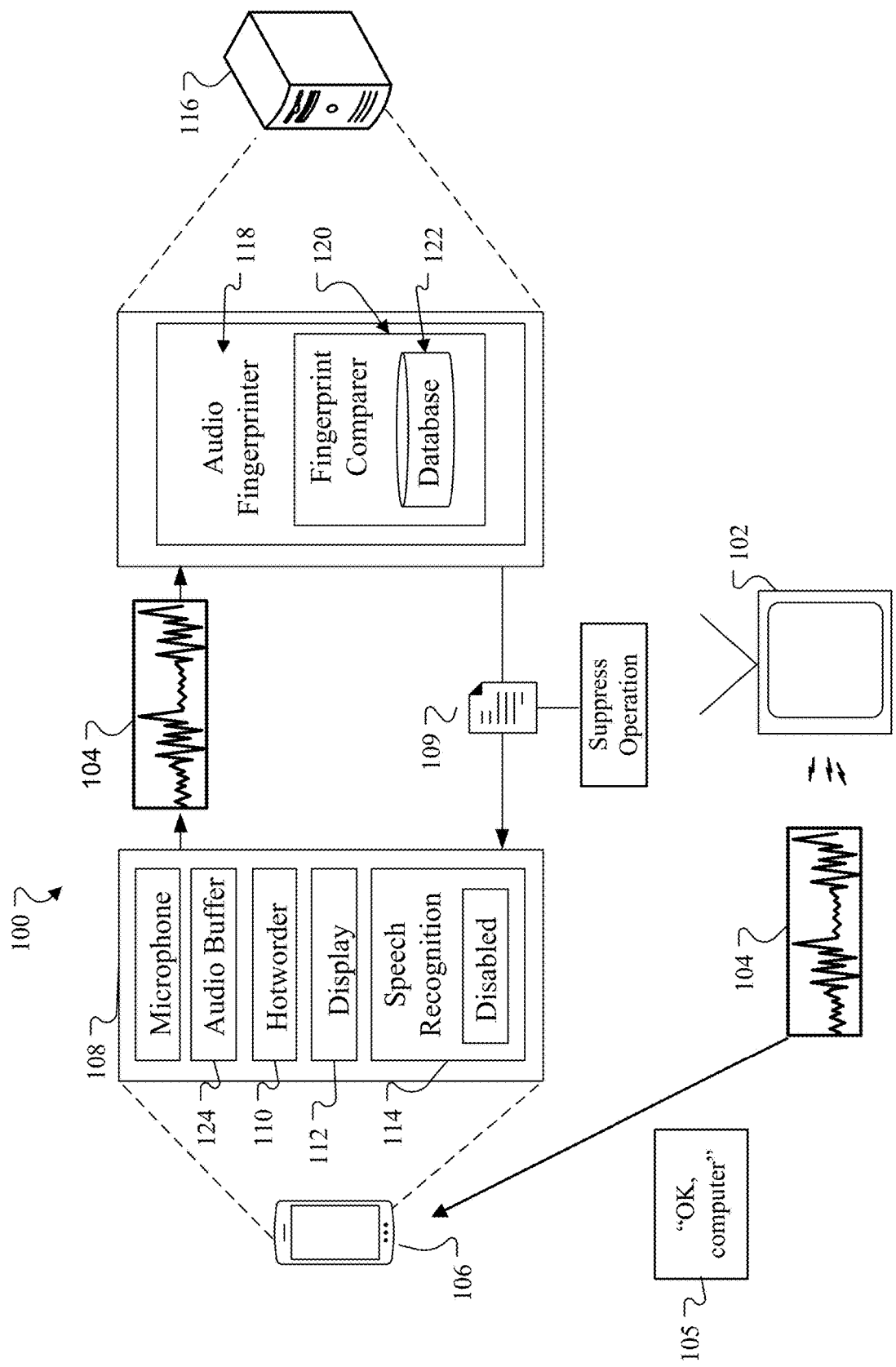
FIG. 1 is a diagram of an example system for hotword trigger suppression.

FIG. 1 is a diagram of an example system 100 for hotword suppression. The example system 100 determines if an audio input, such as audio data 104, includes a hotword 104 as a part of a pre-recorded media item, and suppresses the operation on an ensuing command in response. In general, system 100 illustrates an audio device 102 outputting audio data 104 that is detected by the microphone 108 of computing device 106. The computing device 106 stores the audio data 104 in an audio buffer 124. The computing device processes the audio data 104 using a hotworder 110 to determine if the audio data 104 includes a hotword 105. Once the hotword 105 is detected, the audio data 104 is sent to a server 116. The server 116 has an audio fingerprinter 118 that feeds the encoded audio containing the hotword 105 to a fingerprint comparer 120. The fingerprint comparer 120 contains a database 122 of audio fingerprints. If the fingerprint comparer 120 determines that the audio 104 corresponds to the playback of an item of media content, an instruction 109 may be sent to the computing device 106 to suppress the performance of the operation on the computing device.

The computing device 106 can be, for example, a desktop computer, laptop computer, a tablet computer, a wearable computer, a cellular phone, a smart phone, a music player, an e-book reader, a navigation system, a smart speaker and home assistant, or any other appropriate computing device. The audio device 102 can be any source of audio such as, for example, a television, a radio, a music player, a desktop computer, laptop computer, a tablet computer, a wearable computer, a cellular phone, or a smart phone.

When the audio device 102 outputs the audio data 104 that includes the hotword 105 "OK computer," the computing device 106 in the vicinity of the audio device 102 detects and processes the audio data 104. The computing device detects the audio data 104 through an audio input device such as a microphone 108. The microphone 108 provides audio data 104 to a respective audio subsystem. The respective audio subsystem may buffer, filter, and digitize the audio data 104. In some implementations, the computing device 106 may also perform endpointing and speaker identification on the audio data 104. The audio subsystem may include an audio buffer 124 to store filtered and digitized audio data. The audio subsystem provides the processed audio data to a hotworder 110. The hotworder 110 compares the processed audio data to known hotword data and computes a confidence score that indicates the likelihood that the audio data 104 includes a hotword.

The hotworder 110 may extract audio features from the processed audio data such as filter bank energies or mel-frequency cepstral coefficients. The hotworder 110 may use classifying windows to process these audio features such as by using a support vector machine or a neural network. Based on the processing of the audio features, if the hotworder 110 computes a confidence score that exceeds a threshold confidence score, the audio data 104 is sent to the audio fingerprinter 118. In some implementations, the computing device 106 sends the processed audio data to the server 116 and the server 116 computes a hotword confidence score. In this instance, the server 116 includes a hotworder similar to hotworder 110. The audio data 104 sent to the audio fingerprinter 118 may include the hotword 105 and audio preceding or/and following the hotword 105. In some implementations, the audio data 104 sent to the audio fingerprinter 118 may include any portion of the audio data 104. The portion of the audio data 104 may or may not include the hotword 105. The portion of the audio data 104 may be an initial or ending portion of the audio data 104. The portion of the audio data 104 may precede or follow the hotword 105 either immediately or with some audio between the portion and the hotword 105.

After receiving the audio data 104, the audio fingerprinter 118 extracts relevant acoustic characteristics from the audio data 104 to obtain an audio signature, a content-based compact digital signature that summarizes the audio data 104. The audio fingerprint extracted from the audio data 104 is sent to a fingerprint comparer 120. This audio fingerprint is compared to the one or more audio fingerprints in the fingerprint database 122 using efficient matching algorithms. The fingerprint comparer 120 may compute a match score that indicates the likelihood that the audio data 104 matches an audio fingerprint in the fingerprint database. The fingerprint database 122 may be a database of known audio recordings (e.g., music, TV programs, movies, etc.) that may contain or are associated with hotwords. For example, the audio recordings may include audio that occurs before an actor speaks a hotword in a commercial. As another example, the audio recordings may include audio that occurs after an actress speaks a hotword in a movie.

The fingerprint database 122 may contain audio fingerprints of audio files that may be stored in a table embedded in a binary format. Updates to the fingerprint database 122 may be made by updates to the computing device 106. The fingerprint database 122 may be updated by adding commercials and other media that contain the hotword, such as hotword 105. The user may be able to update the fingerprint database 122 with audio that has hotword triggers in it. The fingerprint database 122 might also be updated by finding and identifying spikes in trigger activity among devices and identifying the triggering media and adding the media to the fingerprint database 122. Audio recordings that contain the hotword 105 may also be identified by using available audio transcripts of the audio recordings.

Upon determining that the audio fingerprint including the predefined hotword that is associated with performing an operation on the computing device 106 corresponds to at least one of the one or more audio fingerprints contained in the fingerprint database 122, the server 116 sends an instruction 109 to the computing device 106 to suppress the processing of the operation associated with the hotword 105 by the computing device 106. The fingerprint comparer 120 performs this determination by comparing the match score to a threshold match score. If the match score satisfies the threshold match score, the server 116 sends an instruction 109 to the computing device 106 to suppress the processing of the operation associated with the hotword 105 by the computing device 106. If the match score does not satisfy the threshold match score, then the server 116 provides an instruction 109 to the computing device 106 to process the operation.

Upon sending an instruction 109 to the computing device 106 to suppress the processing of the operation associated with the hotword 105 by the computing device 106, the system 100 may store data corresponding to the process of suppression. Storing the data about suppressed queries may be useful for further quality improvements and tracking the performance of existing systems.

The audio data 104 that is sent to the hotworder 110 and to the audio fingerprinter 118 may include the hotword 105. In some implementations, the computing device 106 streams audio data 104 to the audio fingerprinter 118 for a predetermined amount of time after the hotword 105 was uttered. In certain implementations, endpointing may be performed on the audio data 104 following the utterance of the hotword 105. An endpoint may be detected by detecting the locations of a discontinuity in the audio data 104 following the hotword 105. Once an endpoint is detected, the audio fingerprinter 118 may begin processing the received audio and the computing device 106 may cease streaming the audio data 104.

The functions performed by the audio fingerprinter 118 or hotworder 110 or both can be performed by a server 116 or by the computing device 106, by other individual computer systems or can be distributed across multiple computer systems.

The audio fingerprinter 118 may be a part of a separate server 116. The computing device 106 may detect a hotword 105 in the audio data 104 and this hotword 105 may trigger the activation of the computing device 106. Upon detecting the hotword 105, the computing device 106 may send the audio data 104 with the hotword 105 and any additional audio data following or preceding or both following and preceding the hotword 105 to a server 116. Once the server 116 receives the required amount of audio data 104, the server 116 may perform the audio fingerprinting processes to determine if the audio data 104 is a part of pre-recorded media. In one aspect, the server 116 might wait until a predetermined amount of audio has been received. In another aspect, the server 116 might wait until the endpoint of the audio data 104 before processing the audio data 104. The computing device 106 might provide an indication of the detection of a hotword 105, and send the audio data 104 to the server 116. The indication may be a light flashing or a sound such as a beep. The indication may remain until the computing device 106 processes the following audio or until the computing device 106 receives an instruction 109 to suppress the processing of the operation associated with the hotword 105 by the computing device 106. In one example, a home assistant may light up or beep when the hotword 105 "OK computer" is detected. The lights might spin or flicker, to indicate that the device is waiting for the audio fingerprinter 118 to respond for a while; and then the lights might deactivate if the hotword 105 is suppressed.

The fingerprint database 122, which may be a part of the server 116 or stored locally on the computing device 106, may be updated with audio fingerprints very quickly and efficiently. Upon sending an instruction 109 to the computing device 106 to suppress the processing of the operation associated with the hotword 105 by the computing device 106, the system 100 may store data on the server 116 corresponding to the process of suppression. Logging the data about suppressed queries may be useful for further quality improvements and tracking the performance of existing systems. Suppression accuracy may be evaluated from the data logs. The audio fingerprinting technology on the server 116 may be updated and improved rapidly. In some implementations, the data logs may be available to the user. For example, a user may be able to find an entry for each suppressed query on a personal web history page.

In some implementations, the fingerprint database 122 might contain data corresponding to the time of broadcast of media items. For example, the fingerprint database 122 might have commercial airing schedules. The database 122 might have information about when commercials with the particular hotword might be broadcast. This might help the system to use the information to more easily and quickly identify the hotword and perform the hotword trigger suppression.

In some implementations, the audio fingerprinter 118 may be a part of computing device 106. The audio data 104 including the hotword 105 is sent to the audio fingerprinter 118 in order to determine if the audio data 104 is part of a pre-recorded media item. The computing device 106 might store a predetermined amount of audio data 104 in the audio buffer 124. Once the hotword 105 is detected, the audio fingerprinter 118 might process the audio data 104 including the hotword 105 and the data in the audio buffer 124. For example, the computing device 106 might store 10 seconds of audio in the audio buffer 124 at all times. If a television commercial is playing on a television, when the hotword triggers, the computing device 124 might fingerprint the 10 seconds of audio data 104 from the audio buffer 124. If the television commercials contain several seconds of audio data 104 before the first hotword 105, then the computing device 106 already has audio to match against the commercial and may not need any more audio data following the hotword 105. This may speed up the suppression process.

In some implementations, the audio fingerprinter 118 may compare the portion of the audio data 104 preceding the hotword 105 with the audio fingerprints in the fingerprint database 122. In some implementations, the audio fingerprinter 118 may compare the hotword 105 with the audio fingerprints in the fingerprint database 122. In some implementations, the audio fingerprinter 118 may compare the portion of the audio following the hotword 105 with the audio fingerprints in the fingerprint database 122. For example, a television commercial may begin with a hotword 105, in such a situation, the system may fingerprint the hotword 105, along with any ensuing audio.

In some implementations, the computing device 106 may appear to be unaffected by the receipt of the audio data 104 from the audio device 102. For example, the user 126 may be watching a commercial on the audio device 102 and may be reading text on the computing device 106 in the user's hand. When a hotword 105 is detected in the audio data 104 from the commercial the computing device 106 may receive the audio data 104, process the audio data 104, and suppress the performance of the operation. The entire time, the activation state of the computing device 106 may remain unaffected, allowing the user to continue reading the text. If the computing device was in a low power state, a sleep state or an inactive state, it may remain unaffected during the audio detection, the audio processing and the performance suppression of the operation.

In some implementations, the computing device 106 may provide an indication of the detection of a hotword 105, but once the instruction is received by the computing device 106 to suppress the processing of the operation associated with the hotword 105 by the computing device 106, the indication may be disabled. In one example, a home assistant may light up or beep when the hotword "OK computer" is detected. The lights might spin or flicker, to indicate that the computing device 106 is waiting for the audio fingerprinter 118 to respond for a while; and then the lights might deactivate go away when the hotword 105 is suppressed.

In some implementations, the computing device 106 may begin to perform speech recognition on speech following the hotword 105 until the computing device 106 receives a signal to suppress the speech recognition process. The hotworder 110 computes a hotword confidence score and if the hotword confidence score satisfies a threshold, then the computing device 106 performs speech recognition on speech following the hotword 105. The computing device 106 may perform the speech recognition without displaying any indication of the speech recognition to the user. This may be desirable because doing so gives the user the impression that the computing device 106 is not active while also allowing the computing device to display results based on the speech recognition to the user quicker than if the computing device 106 had waited until the computing device 106 confirmed that the audio did not correspond to playback of an item of media content. As an example, the computing device 106 computes a hotword confidence score that exceeds the confidence threshold and begins to perform speech recognition on speech following the hotword 105. The computing device 106 sends the audio data 104 to the audio fingerprinter, which processes the audio data 104 and determines that the audio data 104 does not match any audio fingerprint in the fingerprint database 122. The computing device 106 continues to perform speech recognition on speech following the hotword 105 and presents the results to the user. As another example, if the audio fingerprinter 118 determines that the audio data 104 matches an audio fingerprint in the fingerprint database 122 and thus corresponds to playback of an item of media content, a signal is sent to the assistant server to suppress the speech recognition operations. No data is displayed to the user, and the user is likely under the impression that the computing device 106 has remained in a "sleep" state.

In some implementations, to avoid any latency, the server 116 can send a suppress signal to the assistant server before the entire audio data is processed. For example, if the fingerprint match score exceeds a threshold match score even before the entire audio data 104 is fingerprinted, the audio fingerprinter 118 could notify the assistant server to suppress the operation on the computing device 106.

In some implementations, an indication is provided by the computing device 106 to one or more other computing devices that performance of the operation on the computing device 106 has been suppressed. This may be a beep or a light flashing on the other computing device. In some implementations, the other computing device may display a message on the display letting the user know that an action was suppressed.

After receiving the instruction to suppress the performance of the operation on the computing device 106, the device may notify nearby devices to not respond to the hotword. In some implementations, the computing device 106 identifies other nearby computing devices that are configured to respond to the hotword 105 by searching the local network or by using short range radio for other devices that are configured to respond to the hotword 105. For example, computing device 106 may search the local area network for other devices that are configured to respond to the hotword 105 and identify two other computing devices.

In some implementations, the computing device 106 identifies other nearby computing devices that are configured to respond to the hotword 105 by identifying the user who is logged into each device. For example, user 126 is logged into three computing devices. Each computing device shares information that is related to the user who is logged into the computing device, such as a user identifier.

Figure 2:
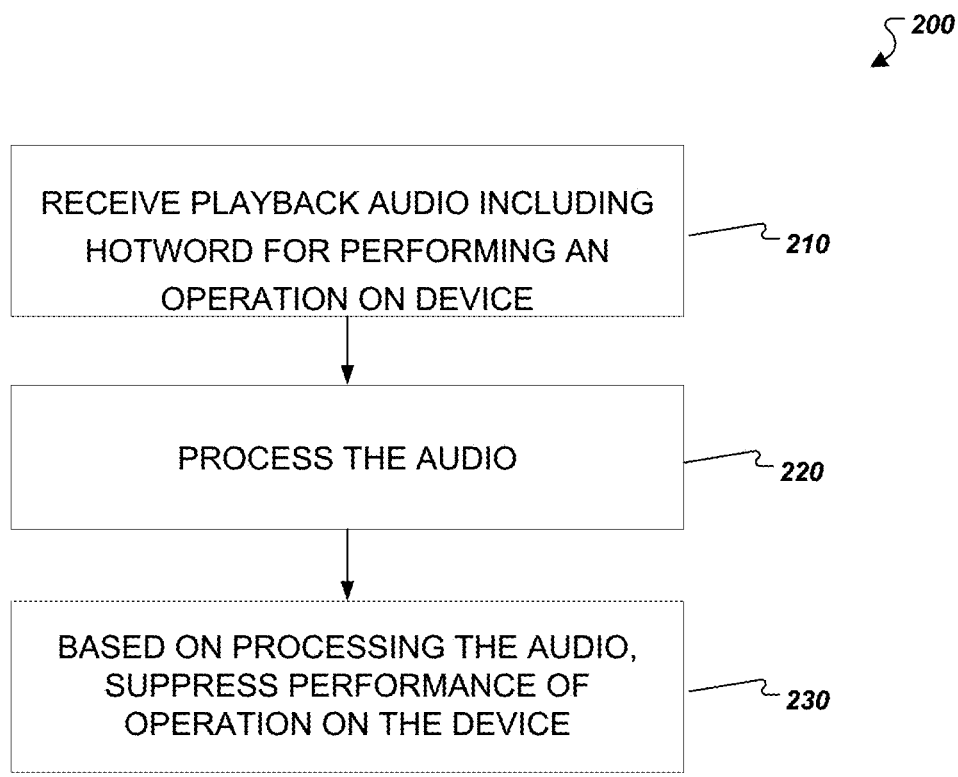
FIG. 2 is a diagram of an example process for suppressing hotword triggers from recorded media.

FIG. 2 is a diagram of an example process 200 for hotword detection. The process 200 may be performed by a computing device such as the computing device 106 from FIG. 1. The process 200 processes audio corresponding to playback of an item of media content, the audio including an utterance of a predefined hotword that is associated with performing an operation on the computing device and in response to processing the audio, suppresses the performance of the operation on the computing device.

The computing device 106 receives playback audio 104 including a hotword 105 for performing an operation on a device (210). The playback audio 104 is received from the speaker of an audio device and a microphone of the computing device receives the audio data. As an example, a television 102 may be broadcasting a commercial with the words "OK computer" and the microphone 108 of the computing device 106 receives the audio data 104 that includes the hotword "OK computer" 105. The audio data 104 is then processed (220). This may involve buffering, filtering, and digitizing the audio data 104. A hotworder 110 compares the processed audio data to known hotword data, and determines if the audio data 104 contains a hotword 105. The audio data 104 containing the hotword 105 audio or without the hotword 105 audio is then sent to an audio fingerprinter 118. Based on processing the audio data 104, performance of the operation on the computing device 106 may be suppressed (230).

In some implementations, the audio fingerprinting and comparing may occur on one server and the instructions may be provided to the device by another server. In some implementations, the audio fingerprinting and comparing may be performed on the computing device 106.

In some cases, a user may want the computing device 106 to perform an operation in response to a hotword 105 even when the hotword 105 is identified as being a part of a pre-recorded media item. In such a situation, the computing device 106 might provide, for output, a selectable option which, upon selection by a user, provides an instruction to the computing device 106 to perform the operation on the computing device. This could be a message on the display of the computing device 106 asking if the operation needs to be performed. The user 126 may be able to select an option on the display or send an option through any other input device. For example, a commercial playing on a television 102 may contain the utterance "OK computer what's the weather?" The computing device 106 may then determine that the hotword is part of a pre-recorded media item and suppresses the following command. The computing device 106 may provide an indication to the user that the command was suppressed. If the user wants the command to be processed anyway, the user can select an option on the computing device 106 instructing the device to continue to process the command. In response to detecting a selection of the selectable option, the computing device 106 may, in some instances, adjust a process for processing subsequently received audio that includes an utterance of the predefined hotword.

As another example, the computing device 106 might misidentify an utterance by a user as belonging to a pre-recorded media item. In such a situation, the system may provide the user a selectable option to cancel the suppression of the performance of the operation. In this instance, the computing device 106 may also adjust the processing for processing subsequently received audio that includes an utterance of the predefined hotword.

Figure 3:
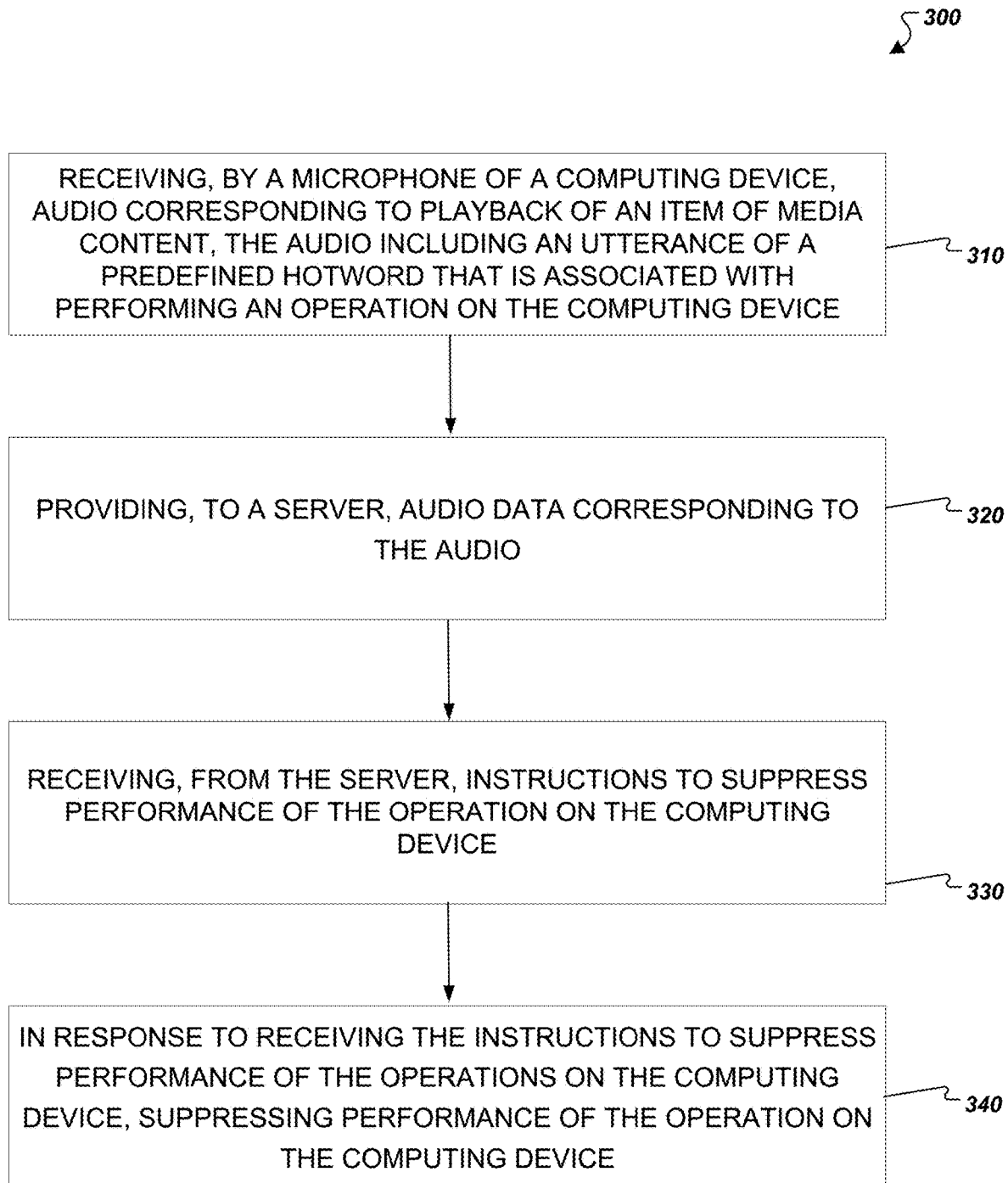
FIG. 3 is a diagram of an example process for suppressing hotword triggers from recorded media.

FIG. 3 is a diagram of an example process 300 for hotword detection. The process 300 may be performed by a computing device such as the computing device 106 from FIG. 1. The process 300 receives, by a microphone of a computing device, audio corresponding to playback of an item of media content, the audio including an utterance of a predefined hotword that is associated with performing an operation on the computing device; provides, to a server, audio data corresponding to the audio; receives, from the server, instructions to suppress performance of the operation on the computing device; in response to receiving the instructions to suppress performance of the operations on the computing device, suppressing performance of the operation on the computing device.

The computing device 106 receives, by a microphone 108 of computing device 106, audio 104 corresponding to playback of an item of media content, the audio 104 including an utterance of a predefined hotword 105 that is associated with performing an operation on the computing device (310). Similar to step 210, the audio 104 is received from a speaker of an audio device, such as television 102. The television 102 may broadcast an item of media content, such as a song, that includes an utterance of a predefined hotword that is associated with performing an operation on the computing device 106. For example, the song may include the words "OK computer" 105 that is typically associated with performing an operation on the computing device 106.

The computing device 106 provides the audio data 104 to a server 116 (320). The server 116 has an audio fingerprinter 118 that extracts relevant acoustic characteristics from the audio data 104 to obtain an audio signature, a content-based compact digital signature that summarizes the audio data 104. The audio fingerprint extracted from the audio data 104 is sent to a fingerprint comparer 120. This audio fingerprint is compared to the one or more audio fingerprints in the fingerprint database 122 using efficient matching algorithms. The fingerprint comparer 120 may compute a match score that indicates the likelihood that the audio data 104 matches an audio fingerprint in the fingerprint database. The fingerprint database 122 may be a database of known audio recordings (e.g., music, TV programs, movies, etc.) that may contain or are associated with hotwords. The fingerprint comparer 120 performs this determination by comparing the match score to a threshold match score. If the match score satisfies the threshold match score, the server 116 sends an instruction 109 to the computing device 106 to suppress the processing of the operation associated with the hotword 105 by the computing device 106. If the match score does not satisfy the threshold match score, then the server 116 provides an instruction 109 to the computing device 106 to process the operation.

In some implementations, if the server 116 provides the instruction 109 to the computing device 106 to process the operation, the computing device 106 might provide, for output, a selectable option which, upon selection by a user, provides an instruction to the computing device 106 to perform the operation on the computing device. For instance, a commercial playing on television 102 may contain the utterance "OK computer, what time is it?" If the user wants the command to be processed anyway, the user can select an option on the computing device 106 instructing to continue to process the command. In response to detecting a selection of the selectable option, the computing device 106 may, in some instances, adjust a process for processing subsequently received audio that includes an utterance of the predefined hotword.

In some implementations, the computing device 106 may automatically process the received audio that includes an utterance of the predefined hotword, in response to receiving the instruction 109 from the server 116 instructing the computing device 106 to process the received audio. In this instance, the computing device 106 will not provide an output to the user, but will automatically process the received audio. For example, the computing device 106 may process the audio that includes the utterance "OK computer, what time is it?" In response to processing the utterance, the computing device 106 may provide a response to the utterance. In this example, the response may include an audible or visual answer displayed by the computing device that recites "The time is 2:31 PM."

The computing device 106 receives, from the server 116, an instruction 109 that instructs the computing device 106 to suppress performance of the operation associated with the computing device 106 (330). The instruction 109 may include one or more processing operations for computing device 106 to execute in order to suppress performance of the operation.

In response to receiving the instruction 109 to suppress performance of the operations on the computing device 106, the computing device 106 suppresses performance of the operation on the computing device 106. (340).

Figure 4:
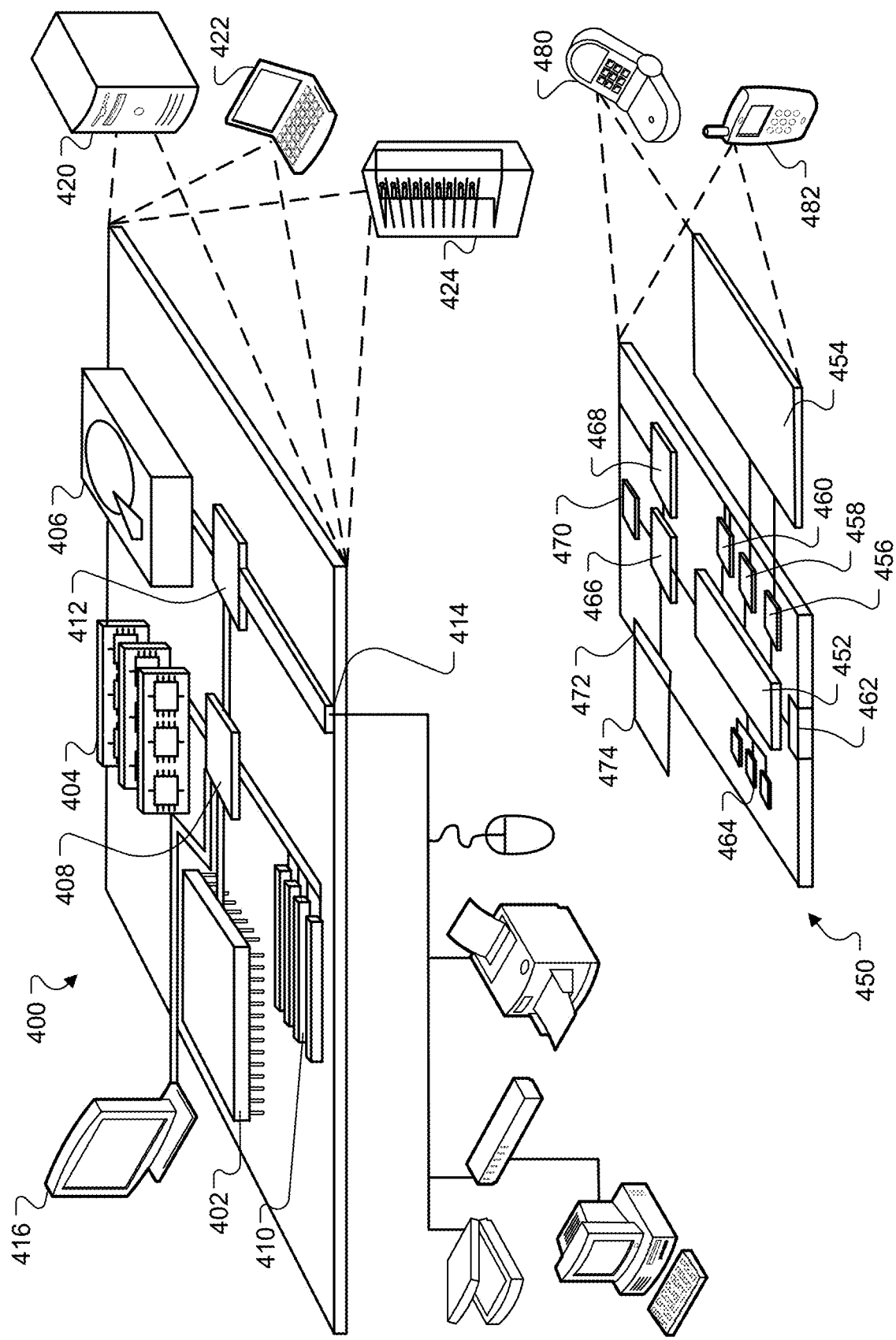
FIG. 4 shows an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
    receiving, at a computing device, audio data corresponding to playback of an item of media content, the audio data captured by a microphone of the computing device;
    detecting, by the computing device, an utterance of a predefined hotword in the audio data;
    in response to detecting the utterance of the predefined hotword:
        initiating, by the computing device, performance of speech recognition on speech following the utterance of the predefined hotword in the audio data;
        generating, by the data processing hardware, an audio fingerprint of the audio data; and
        determining, by the data processing hardware, that the audio fingerprint corresponds to a stored audio fingerprint, the stored audio fingerprint associated with a known audio recording that contains or is associated with the predefined hotword; and
    in response to determining that the audio fingerprint corresponds to the stored audio fingerprint:
        ceasing, by the computing device, the performance of speech recognition on the speech following the utterance of the predefined hotword in the audio data; and
        sending, by the computing device, to each of one or more nearby computing devices configured to respond to the predefined hotword, a notification instructing each of the one or more nearby computing devices to not respond to the utterance of the predefined hotword in the audio data.

2. The method of claim 1, further comprising:
    in response to detecting the utterance of the predefined hotword, activating, by the computing device, a display of the computing device to display data indicating that performance of speech recognition on the speech is in progress; and
    in response to determining that the audio fingerprint corresponds to the stored audio fingerprint, deactivating, by the computing device, the display of the computing device.

3. The method of claim 1, further comprising:
    in response to detecting the utterance of the predefined hotword, activating, by the computing device, a light on the computing device to flash while speech recognition is performed on the speech; and
    in response to determining that the audio fingerprint corresponds to the stored audio fingerprint, deactivating, by the computing device, the light on the computing device.

4. The method of claim 1, further comprising, in response to detecting the utterance of the predefined hotword, providing, by the computing device, an audible alert from the computing device to indicate that performance of speech recognition on the speech is in progress.

5. The method of claim 1, wherein the computing device is in a low power/sleep/inactive state while:
    receiving the audio data;
    detecting the utterance of the predefined hotword;
    initiating the performance of speech recognition;
    generating the audio fingerprint;
    determining that the audio fingerprint corresponds to the stored audio fingerprint;
    ceasing the performance of speech recognition; and
    sending the notification.

6. The method of claim 1, wherein detecting the utterance of the predefined hotword in the audio data comprises detecting the utterance of the predefined hotword without performing speech recognition on the audio data.

7. The method of claim 1, wherein determining that the audio fingerprint corresponds to the stored fingerprint comprises:
    providing the audio fingerprint to another computing device that stores the stored audio fingerprint;
    providing, to the other computing device that stores the stored audio fingerprint, a request to compare the audio fingerprint to the stored audio fingerprint; and
    receiving, from the other computing device, comparison data indicating that the audio fingerprint corresponds to the stored fingerprint.

8. The method of claim 1, wherein initiating performance of speech recognition on the speech following the utterance of the predefined hotword in the audio data comprises initiating performance of speech recognition on the speech without displaying any indication of the speech recognition.

9. The method of claim 1, further comprising, in response to determining that the audio fingerprint corresponds to the stored audio fingerprint:
    searching, by the computing device, a local network for other computing devices configured to respond to the predefined hotword; and
    identifying, by the computing device, each of one or more nearby computing devices configured to respond to the predefined hotword based on searching the local network.

10. The method of claim 1, further comprising, in response to determining that the audio fingerprint corresponds to the stored audio fingerprint, providing, by the computing device, a selectable option to enable a user of the computing device to cancel the ceasing of the performance of the speech recognition on the speech.

11. A computing device comprising:
    data processing hardware; and
    memory hardware in communication with the data processing hardware and storing instructions that when executed by the data processing hardware cause the data processing hardware to perform operations comprising:
        receiving audio data corresponding to playback of an item of media content, the audio data captured by a microphone of the computing device;
        detecting an utterance of a predefined hotword in the audio data;
        in response to detecting the utterance of the predefined hotword:
            initiating performance of speech recognition on speech following the utterance of the predefined hotword in the audio data;
            generating an audio fingerprint of the audio data; and determining that the audio fingerprint corresponds to a stored audio fingerprint, the stored audio fingerprint associated with a known audio recording that contains or is associated with the predefined hotword; and in response to determining that the audio fingerprint corresponds to the stored audio fingerprint:
ceasing the performance of speech recognition on the speech following the utterance of the predefined hotword in the audio data; and
sending, to each of one or more nearby computing devices configured to respond to the predefined hotword, a notification instructing each of the one or more nearby computing devices to not respond to the utterance of the predefined hotword in the audio data.

12. The computing device of claim 11, wherein the operations further comprise:
in response to detecting the utterance of the predefined hotword, activating a display of the computing device to display data indicating that performance of speech recognition on the speech is in progress; and
in response to determining that the audio fingerprint corresponds to the stored audio fingerprint, deactivating the display of the computing device.

13. The computing device of claim 11, wherein the operations further comprise:
in response to detecting the utterance of the predefined hotword, activating a light on the computing device to flash while speech recognition is performed on the speech; and
in response to determining that the audio fingerprint corresponds to the stored audio fingerprint, deactivating the light on the computing device.

14. The computing device of claim 11, wherein the operations further comprise, in response to detecting the utterance of the predefined hotword, providing an audible alert from the computing device to indicate that performance of speech recognition on the speech is in progress.

15. The computing device of claim 11, wherein the computing device is in a low power/sleep/inactive state while:
receiving the audio data;
detecting the utterance of the predefined hotword;
initiating the performance of speech recognition;
generating the audio fingerprint;
determining that the audio fingerprint corresponds to the stored audio fingerprint;
ceasing the performance of speech recognition; and
sending the notification.

16. The computing device of claim 11, wherein detecting the utterance of the predefined hotword in the audio data comprises detecting the utterance of the predefined hotword without performing speech recognition on the audio data.

17. The computing device of claim 11, wherein determining that the audio fingerprint corresponds to the stored fingerprint comprises:
providing the audio fingerprint to another computing device that stores the stored audio fingerprint;
providing, to the other computing device that stores the stored audio fingerprint, a request to compare the audio fingerprint to the stored audio fingerprint; and
receiving, from the other computing device, comparison data indicating that the audio fingerprint corresponds to the stored fingerprint.

18. The computing device of claim 11, wherein initiating performance of speech recognition on the speech following the utterance of the predefined hotword in the audio data comprises initiating performance of speech recognition on the speech without displaying any indication of the speech recognition.

19. The computing device of claim 11, wherein the operations further comprise, in response to determining that the audio fingerprint corresponds to the stored audio fingerprint:
searching a local network for other computing devices configured to respond to the predefined hotword; and
identifying each of one or more nearby computing devices configured to respond to the predefined hotword based on searching the local network.

20. The computing device of claim 11, wherein the operations further comprise, in response to determining that the audio fingerprint corresponds to the stored audio fingerprint, providing, a selectable option to enable a user of the computing device to cancel the ceasing of the performance of the speech recognition on the speech.

* * * * *